(12) United States Patent
Jang et al.

(10) Patent No.: US 12,489,329 B2
(45) Date of Patent: Dec. 2, 2025

(54) SUPERCONDUCTING MOTOR SYSTEM

(71) Applicants: Hyundai Motor Company, Seoul (KR); Kia Corporation, Seoul (KR); Seoul National University R&DB Foundation, Seoul (KR)

(72) Inventors: Hyung Kwan Jang, Uijeongbu (KR); Byung Ho Min, Suwon (KR); Jun Hyeok Choi, Suwon (KR); Kyung Sik Choi, Seoul (KR); Tae Gyu Lee, Seoul (KR); Hoo Dam Lee, Seongnam (KR); Jonghoon Yoon, Seoul (KR); Geonyoung Kim, Seoul (KR); Chaemin Im, Seoul (KR); Jung Tae Lee, Seoul (KR); Seong Hyeon Park, Seoul (KR); Jeonghwan Park, Suwon (KR); Seungyong Hahn, Seoul (KR); Jeseok Bang, Seoul (KR)

(73) Assignees: Hyundai Motor Company, Seoul (KR); Kia Corporation, Seoul (KR); Seoul National University R&DB Foundation, Seoul (KR)

( * ) Notice: Subject to any disclaimer, the term of this patent is extended or adjusted under 35 U.S.C. 154(b) by 309 days.

(21) Appl. No.: 18/124,917

(22) Filed: Mar. 22, 2023

(65) Prior Publication Data

US 2024/0204599 A1    Jun. 20, 2024

(30) Foreign Application Priority Data

Dec. 15, 2022 (KR) ........................ 10-2022-0176098

(51) Int. Cl.
*H02K 3/28* (2006.01)
*H02K 3/18* (2006.01)
*H02K 11/00* (2016.01)

(52) U.S. Cl.
CPC ................. *H02K 3/28* (2013.01); *H02K 3/18* (2013.01); *H02K 11/0094* (2013.01); *H02K 2203/06* (2013.01)

(58) Field of Classification Search
CPC ........ H02K 3/28; H02K 3/18; H02K 11/0094; H02K 2203/06; H02K 55/04; H02K 1/26; Y02E 40/60; H01F 6/06; H02P 25/18
(Continued)

(56) References Cited

U.S. PATENT DOCUMENTS 4,277,705 A * 7/1981 Rios .......................... H02K 9/20
                                                              310/215
4,282,450 A * 8/1981 Eckels .................... H02K 55/04
                                                              336/DIG. 1
(Continued)

FOREIGN PATENT DOCUMENTS

JP      H09-070168 A      3/1997
JP      2011-091893 A     5/2011
(Continued)

OTHER PUBLICATIONS

Beong, Jeseok, Park, Jeonghwan, Park, Seong Hyeon, Lee, Jung Tae, Im, Chaemin, Kim, Geonyoung, and Hahn, Seungyong, "An HTS Magnet With Individually Controllable Coil Currents Energized by Single Power Source," IEEE Transactions on Applied Superconfictivity, vol. 32, No. 4, Jun. 2022, 5 pages.

*Primary Examiner* — Ahmed Elnakib
(74) *Attorney, Agent, or Firm* — Banner & Witcoff, Ltd.

(57) ABSTRACT

A superconducting motor system includes a stator and one or more rotors inside the stator. The rotors may form a plurality of poles, and may rotate when a current is applied thereto. The one or more rotors include: a superconductor winding portion for each pole and in which superconductor coils are wound to form at least two layers; a power supply portion configured to supply a current to the superconductor wind-
(Continued)

ing portion; and a resistor portion connecting the superconductor winding portion at least partly in parallel to the power supply portion. the resistor portion enables different currents to be able to flow through the at least two layers of the superconductor winding portion.

13 Claims, 9 Drawing Sheets

(58) Field of Classification Search
USPC .................................................. 310/216.74
See application file for complete search history.

(56) References Cited

U.S. PATENT DOCUMENTS

| | | | |
|---|---|---|---|
| 6,507,259 B2 * | 1/2003 | Westphal | G01R 33/421 |
| | | | 324/319 |
| 9,824,838 B2 | 11/2017 | Faulkner | |
| 2006/0119193 A1 * | 6/2006 | Laskaris | H02K 11/00 |
| | | | 310/52 |
| 2024/0204599 A1 * | 6/2024 | Jang | H02K 3/28 |

FOREIGN PATENT DOCUMENTS

| | | |
|---|---|---|
| JP | 2011-217480 A | 10/2011 |
| JP | 2019-068653 A | 4/2019 |

* cited by examiner

SUPERCONDUCTING MOTOR SYSTEM

CROSS-REFERENCE TO RELATED APPLICATION (S)

This application claims benefit of priority to Korean Patent Application No. 10-2022-0176098 filed on Dec. 15, 2022 in the Korean Intellectual Property Office, the disclosure of which is incorporated herein by reference in its entirety.

TECHNICAL FIELD

The present disclosure relates to a superconducting motor system having a multilayer structure.

BACKGROUND

A superconducting motor is a motor that uses a superconductor, a material with close to zero electrical resistance, instead of a conductor (e.g., copper wire used in an existing motor). A superconducting field coil may be used in a superconducting motor may be formed by winding a superconducting wire (e.g., a tape-shaped superconducting wire) in a coil (e.g., a racetrack coil or a pancake coil). The superconducting field coil of one pole is formed by stacking multiple coils as described above to obtain a desired magnetic field and intensity and connected to form two, four, or more poles. Here, the pancake coil may be a single pancake coil or a double pancake coil.

The superconductor is a material whose resistance is zero below a critical temperature. However, where a current above a certain value (a critical current) is transferred through the superconductor, the superconducting property is lost, and the superconductor transitions to a normal conductor. Here, the current that causes the property of the superconductor to be lost is known as a critical current, and such a phenomenon is known as a quench effect.

In a superconducting motor system having a multilayer superconductor structure, all superconductors are connected in series. Therefore, in the superconducting motor system having a multilayer structure, only one current may flow, which must be equal to or lower than the lowest critical current among the critical currents of the superconductors forming the respective layers.

SUMMARY

The following summary presents a simplified summary of certain features. The summary is not an extensive overview and is not intended to identify key or critical elements.

Systems, apparatuses, and methods are described for a superconductor motor system. A superconducting motor system may comprise a stator configured to form a magnetic field; and a rotor, surrounded by the stator, configured to form a plurality of poles, and configured to rotate when a current is applied thereto. The rotor may comprise superconductor winding portions, for the plurality of poles, that each comprise at least two superconductor coils arranged in at least two layers, a power supply portion configured to supply a current to the superconductor winding portions, and a resistor portion configured to connect the superconductor winding portions to the power supply portion, and configured to allow different currents to flow through the at least two layers of each of the superconductor winding portions.

Also, or alternatively, a superconducting motor system may comprise a stator configured to form a magnetic field; and a rotor, surrounded by the stator, configured to form a plurality of poles, and configured to rotate when a current is applied thereto. The rotor may comprise superconductor winding portions, for the plurality of poles, that each comprises at least two superconductor coils arranged in at least two layers; and a power supply portion configured to supply a current to the superconductor winding portions, wherein the power supply portion is configured to enable different currents to flow through the at least two layers of each of the superconductor winding portion.

Also, or alternatively, a superconducting motor system may comprise a stator configured to form a magnetic field; and a rotor, surrounded by the stator, configured to form a plurality of poles, and configured to rotate when a current is applied thereto. The rotor may comprise superconductor winding portions, for the plurality of poles, that each comprises at least two superconductor coils arranged in at least two layers, a power supply portion configured to supply a current to the superconductor winding portions; and a resistor portion connecting the superconductor winding portions to the power supply portion. The resistor portion and the power supply portion may be configured to allow different currents to flow through the at least two layers of each of the superconductor winding portions.

These and other features and advantages are described in greater detail below.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, examples of the present disclosure will be described in detail with reference to the accompanying drawings.

Figure 1:
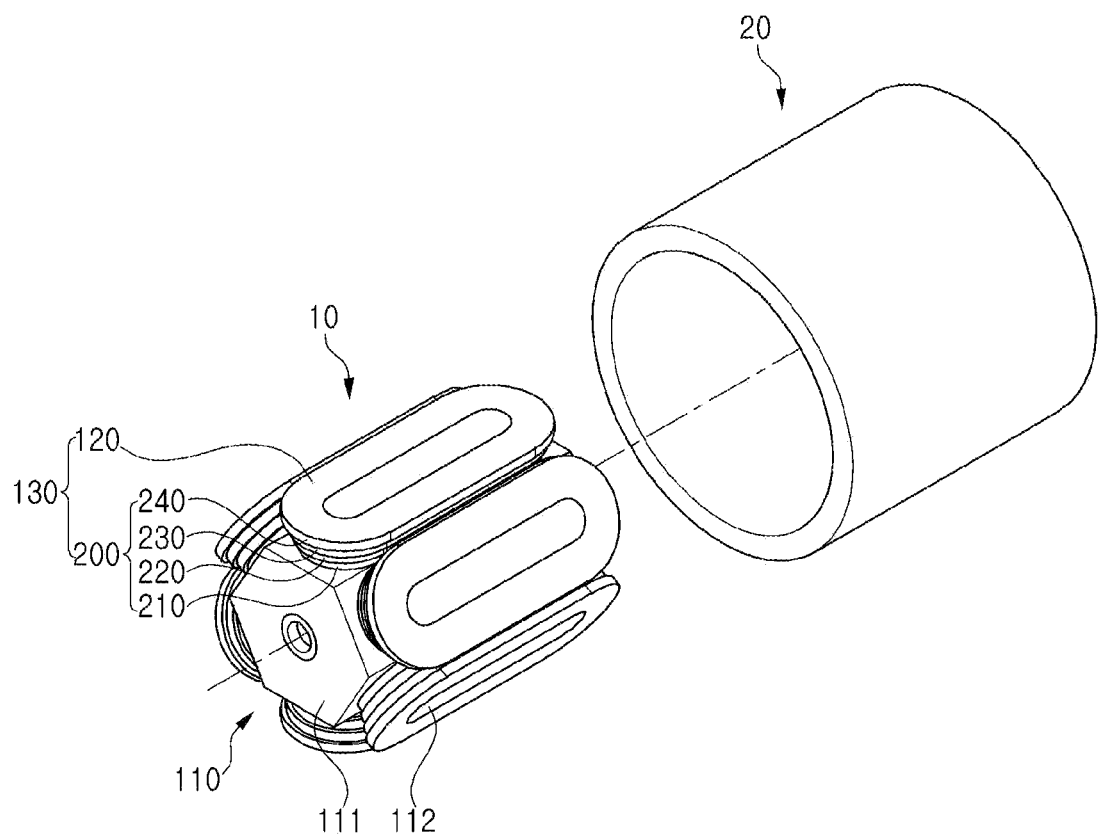
FIG. 1 is a perspective view of a superconducting motor system according to an example of the present disclosure.
Figure 2:
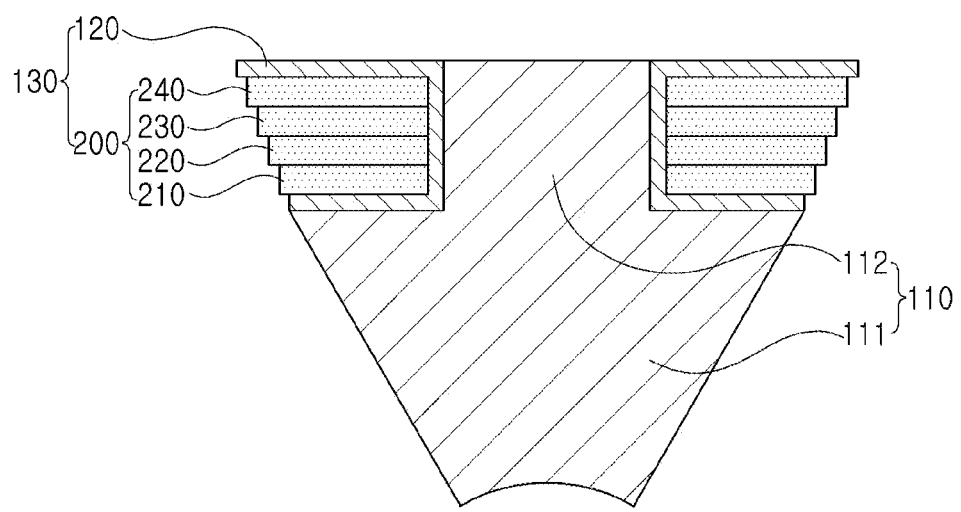
FIG. 2 is an enlarged cross-sectional view of a rotor of the superconducting motor system according to an example of the present disclosure.
Figure 3:
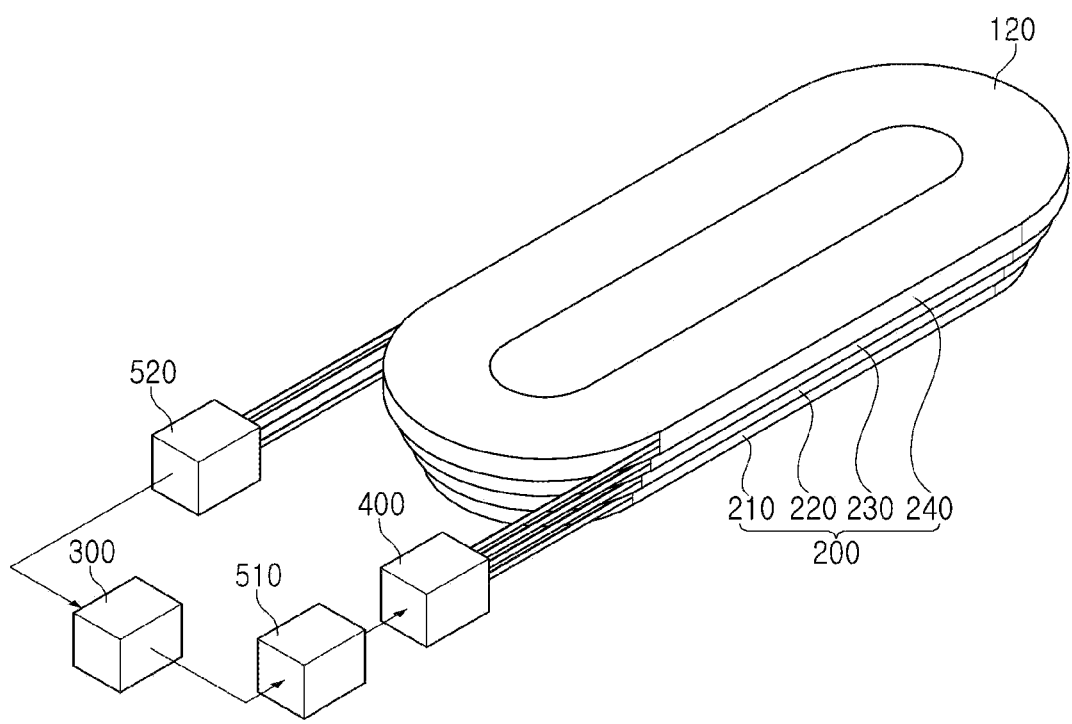
FIG. 3 is a schematic view of the superconducting motor system according to an example of the present disclosure.

FIG. 1 is a perspective view of a superconducting motor system according to an example of the present disclosure, FIG. 2 is an enlarged cross-sectional view of a rotor of the superconducting motor system according to an example of the present disclosure, and FIG. 3 is a schematic view of the superconducting motor system according to an example of the present disclosure.

Referring to FIGS. 1 and 2, the superconducting motor system may include a rotor 10 and a stator 20.

The rotor 10 may include a core portion 110, one or more bobbin portions 120, one or more superconductor winding portions 200, a power supply portion 300, and a lead portion 500.

The core portion 110 may include a body portion 111 and one or more coupling portions 112. The body portion 111 may be coupled to a shaft (not illustrated) in an axial direction, and the one or more coupling portions 112 may be coupled to the one or more bobbin portions 120 and may be radially arranged along an outer circumference of the body portion 111. The body portion 111 may further include a shaft, and the shaft may be provided at the center of the body portion 111 in the axial direction. Also, or alternatively, a hollow hole corresponding to an outer diameter of the shaft may be formed at the center of the body portion 111 in such a manner that the shaft may pass through the hole and be coupled to the body portion 111.

The one or more coupling portions 112 may be radially arranged and may protrude along the outer circumference of the body portion 111. The coupling portion 112 may be coupled to the bobbin portion 120 in a male-female correspondence. For example, the bobbin portion 120 may be fixed to the protruding coupling portion 112, e.g., by inserting the coupling portion 112 into the bobbin portion 120. In the bobbin portion 120, superconductor coils may be wound to form a plurality of layers. The bobbin portion 120 and the coupling portion 112 may form one pole 130 in a state in which the superconductor coils are wound. For example, the rotor 10 illustrated in FIG. 1 may form six poles 130.

The coupling portion 112 and the body portion 111 may be integrally formed, or may be separately formed and coupled.

The bobbin portion 120 may serve as a support around which the super conductor winding portions 200 (e.g., superconductor coils) forming the plurality of layers may be wound, and may include a bobbin, which may have, e.g., a cylinder structure, a rectangular cylinder structure, or an ellipse structure to form a magnetic flux path transferring magnetic flux.

The superconductor winding portion 200 may be wound along an outer surface of the bobbin portion 120 and may include the superconductor coils forming the plurality of layers. Referring to FIGS. 1 through 3, the superconductor winding portion 200 may include a first superconductor coil 210 forming a first layer, a second superconductor coil 220 forming a second layer, a third superconductor coil 230 forming a third layer, and a fourth superconductor coil 240 forming a fourth layer. Each superconductor coil may be a non-insulated double pancake coil, in an example, but the superconductor coil is not limited thereto. Various types of superconductor coils, such as an insulated pancake coil, a single pancake coil, and a racetrack coil, may be applied. In addition, the number of layers formed by the superconductor coils is not limited to four as illustrated in, e.g., FIGS. 1 through 6, and n layers may be formed (see, e.g., FIG. 7).

The power supply portion 300 may comprise a device that supplies a current to the superconductor winding portion 200. The power supply portion 300 may be implemented by a single power supply. Also, or alternatively, the power supply portion 300 may be implemented by a plurality of power supplies, which may be able to supply a current to one or For example, one power more superconductor coil layers. supply may be connected to the first to fourth superconductor coils 210 to 240 and supply a current. Also, or alternatively, the power supply portion 300 may include four power supplies, and the four power supplies may be connected to the first to fourth superconductor coils 210 to 240, respectively, to individually supply a current. Also, or alternatively, the power supply portion 300 may include two power supplies, one power supply may supply a current to the first to third superconductor coils 210 to 230, and the other power supply may supply a current to the fourth superconductor coil 240. Any other distribution of power supplies to semiconductor coils may be provided.

The lead portion 500 may be a superconductor tape connecting the superconductor coils forming the respective layers of the superconductor winding portion 200. The lead portion 500 may include a first lead 510 that is configured to transfer a current supplied from the power supply portion 300 to the superconductor winding portion 200, and a second lead 520 that is configured to transfer a current passing through the superconductor winding portion 200 to the power supply. The lead portion 500 may be a superconductor tape formed of a rare-earth barium copper oxide (REBCO) material. Further, the lead portion 500 may have a width of 12 mm and a length of 20 cm, but is not limited thereto. For example, the lead portion may have a width in a range from 5-20 mm, 10-15 mm, e.g., 12 mm and a length from 10-30 cm, 15-25 cm, e.g., 20 cm.

A resistor portion 400 may be disposed between the superconductor coils and a lead wire. The resistor portion 400 may be configured to generate a resistance in the superconductor coils. The resistor portion 400 may implement a preset resistor size, e.g., by using a lap joint technology.

The stator 20 is a device configured to form a magnetic field and may include a permanent magnet or have a wire wound therearound. The stator 20 may be applied with various known or unknown technologies such as a slotless type or a slot type.

The superconducting motor system is a device in which the stator 20 forms a magnetic field, and the rotor 10 supplies a current to the coil to generate an electromotive force, so that the rotor 10 rotates.

Here, the performance of the motor may be improved by the rotor 10 generating a larger magnetic flux. In addition, the magnetic flux is proportional to the product of an intensity of a current flowing through the superconductor coil wound around the bobbin and the number of turns, which is the number of times the superconductor coil is wound around the bobbin. That is, as the intensity of the current flowing through the superconductor coil increases or the number of turns increases, the magnetic flux generated in the rotor 10 increases, and the output of the motor may increase.

Since a superconductor has a quench effect, in a case where a current higher than a critical current flows, a property of the superconductor is lost and a resistance is generated. Therefore, a current higher than the critical current may not flow while maintaining superconducting operation of the superconductor coil. In a case of a superconductor coil having a multilayer structure, the critical current may be different for each layer.

For a superconducting motor system having a multilayer structure in which all superconductor coils forming the multilayer structure are connected in series, only a current that is equal to or lower than a critical current of a layer having the smallest critical current among critical currents formed by the superconductor coils of the respective layers may flow. In contrast, in the superconducting motor system according to the present disclosure, a current up to the critical current of the superconductor coil in each layer may flow, and thus, magnetic flux formed in each layers may be maximized and/or increased.

Figure 4:
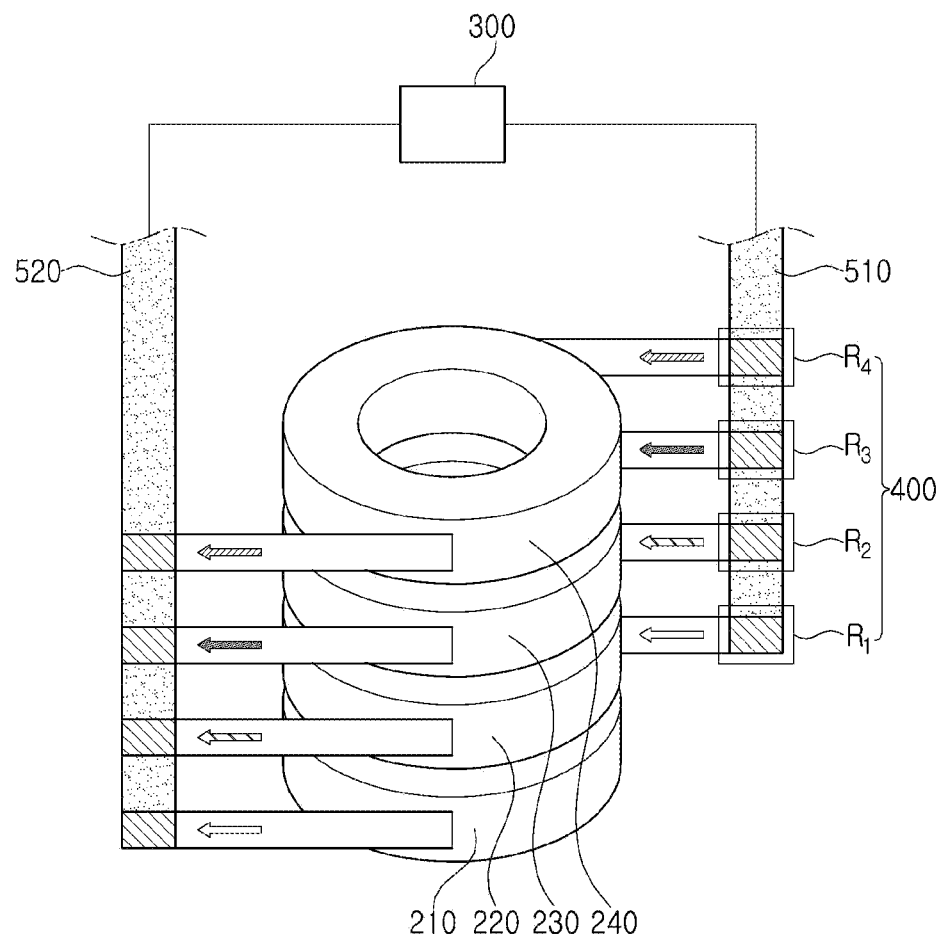
FIG. 4 is a schematic diagram of the superconducting motor system according to an example of the present disclosure.
Figure 5:
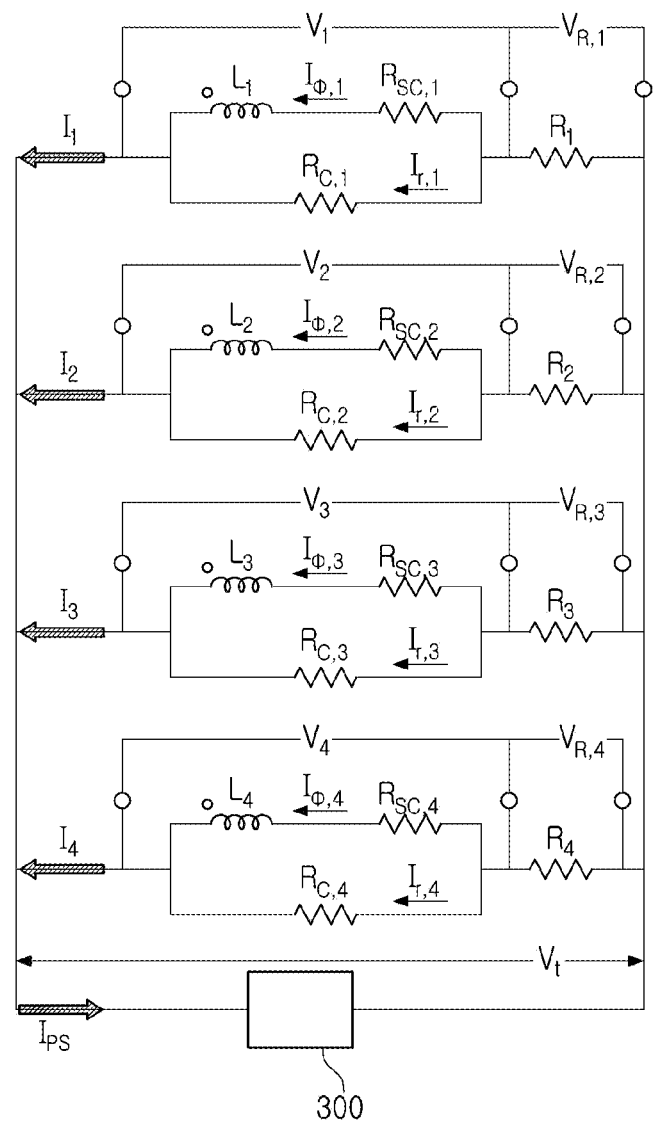
FIG. 5 is a circuit diagram of the superconducting motor system according to an example of the present disclosure.
Figure 6:
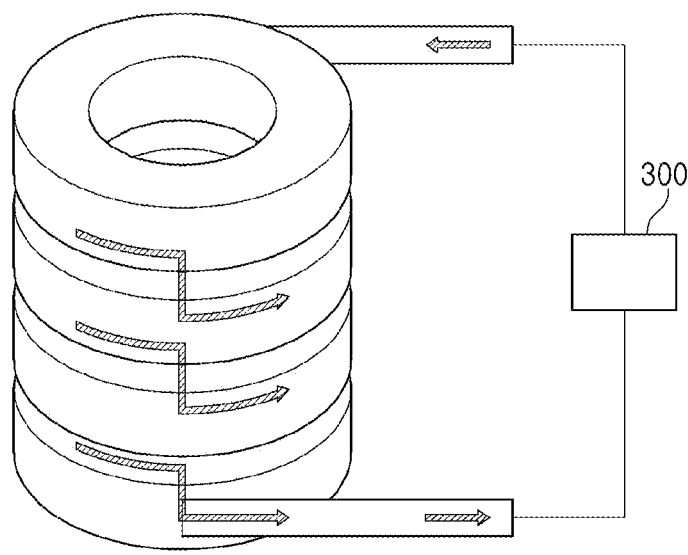
FIG. 6 is a schematic diagram of a superconducting motor system according to the related art.
Figure 7:
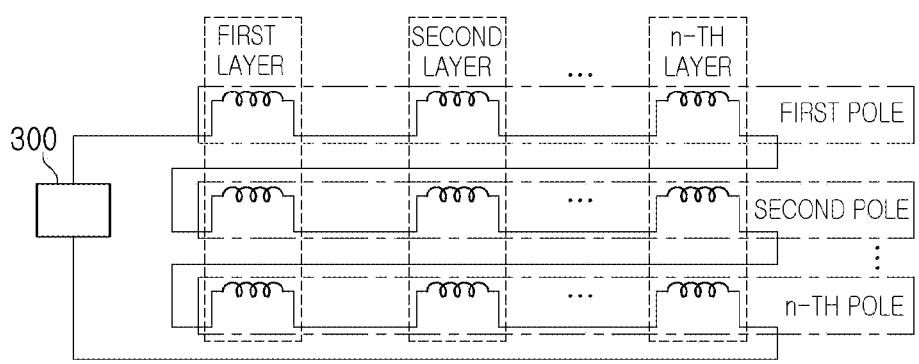
FIG. 7 is a circuit diagram of the superconducting motor system according to the related art.

FIG. 4 is a schematic diagram of the superconducting motor system according to an example of the present disclosure, FIG. 5 is a circuit diagram of the superconducting motor system according to an example of the present disclosure, FIG. 6 is a schematic diagram of a superconducting motor system according to the related art, and FIG. 7 is a circuit diagram of the superconducting motor system according to the related art.

Referring to FIG. 4, in the superconducting motor system according to an example of the present disclosure, the first superconductor coil 210, the second superconductor coil 220, the third superconductor coil 230, and the fourth superconductor coil 240 provided in the superconductor winding portion 200 may form four layers. First ends of the first superconductor coil 210, the second superconductor coil 220, the third superconductor coil 230, and the fourth superconductor coil 240 forming the respective layers may be coupled to the first lead 510, the other ends of the first superconductor coil 210, the second superconductor coil 220, the third superconductor coil 230, and the fourth superconductor coil 240 may be coupled to the second lead 520. Here, the first ends of the first superconductor coil 210, the second superconductor coil 220, the third superconductor coil 230, and the fourth superconductor coil 240 that are coupled to the first leads 510 may be coupled together with the resistor portion 400. More specifically, the first superconductor coil 210 may be coupled to the first lead 510 through a resistor $R_1$, the second first superconductor coil 220 may be coupled to the first lead 510 through a second resistor $R_2$, the third superconductor coil 230 may be coupled to the first lead 510 through a third resistor $R_3$, and the fourth superconductor coil 240 may be coupled to the first lead 510 through a fourth resistor $R_4$. The first lead 510 and the second lead 520 may each be connected to the power supply, and the first lead 510 may transfer a current generated from the power supply to the first superconductor coil 210, the second superconductor coil 220, the third superconductor coil 230, and the fourth superconductor coil 240 through the first resistor $R_1$, the second resistor $R_2$, the third resistor $R_3$, and the fourth resistor $R_4$, respectively. In addition, the current passing through the first superconductor coil 210, the second superconductor coil 220, the third superconductor coil 230, and the fourth superconductor coil 240 may flow to the power supply through the second lead 520.

FIG. 5 is a circuit diagram corresponding to the example in FIG. 4. A reactance L in FIG. 5 is, e.g., a self-generated reactance due to the coil shape of the superconductor. Here, the reactance L may act as a resistance when an initial current passes, that is, in a transient state in which the current flowing through each coil does not reach an equilibrium state, and such a resistance may be referred to as an index resistance $R_{SC}$. In addition, the reactance L generated in one or more of the other layers may act as a resistance, and such a resistance is referred to as a characteristic resistance $R_C$. Further, currents flowing through the first superconductor coil 210, the second superconductor coil 220, the third superconductor coil 230, and the fourth superconductor coil 240 are referred to as a first current $I_1$, a second current $I_2$, a third current $I_3$, and a fourth current $I_4$, respectively. The total current is the sum of the first current $I_1$, the second current $I_2$, the third current $I_3$, and the fourth current $I_4$. A voltage generated in the coil is referred to as a coil voltage, and a voltage generated in the resistor may be referred to as a control voltage. Voltages applied to the first superconductor coil 210, the second superconductor coil 220, the third superconductor coil 230, and the fourth superconductor coil 240 are referred to as a first coil voltage, a second coil voltage, a third coil voltage, and a fourth coil voltage, respectively, and voltages applied to the first resistor $R_1$, the second resistor $R_2$, the third resistor $R_3$, and the fourth resistor $R_4$ are referred to as a first control voltage, a second control voltage, a third control voltage, and a fourth control voltage, respectively. In the following, for illustrative purposes, index resistance $R_{SC}$ may be assumed to be 0.

The total voltage may be the sum of the coil voltages and the control voltages. Further, the total voltage may be expressed as the following Equation 1.

$$V_{tot}(t) = L_i \frac{dI_{\phi,1}(t)}{dt} + R_{sc,i}I_{\phi,i}(t) + I_i(t)R_1(t) \equiv R_{c,i}I_{r,i}(t) + I_i(t)R_i(t) \quad \text{Equation 1}$$

Here, a value of the current flowing through each superconductor coil may be expressed as the following Equation 2.

$$I_{\phi,i}(t) + I_{r,i}(t) = I_i(t) \quad \text{Equation 2}$$

Here, a current flowing for the index resistance $R_{SC}$ ($I_{\phi,i}(t)$) of the superconductor coil may have a target current ($I^*_{\phi,i}(t)$) corresponding to the critical current. Further, a current flowing for the characteristic resistance $R_C$ subjected to the Laplace transform may be expressed as Equation 3.

$$I_{r,i}(s) = \frac{sL_i I^*_{\phi,i}(s)}{R_{c,i}} \quad \text{Equation 3}$$

An operating current may be expressed as Equation 4 by arranging Equation 2, the target current flowing for the index resistance, and Equation 3.

$$I_{op}(s) = \sum \left(1 + \frac{sL_i}{R_{c,i}}\right) I^*_{\phi,i}(s) \quad \text{Equation 4}$$

Equation 5 may be obtained by arranging Equation 3 and Equation 4 together with Equation 1.

$$V_{tot}(s) = sL_i I^*_{\phi,i}(s) + \left(1 + \frac{sL_i}{R_{c,i}}\right) I^*_{\phi,i}(s) R_i(s) \quad \text{Equation 5}$$

A control expression considering both self-reactance and mutual reactance that may be generated in the superconductor coil may be obtained using Equation 5, and as current flowing through each superconductor coil is controlled by using the control expression, an optimum current (e.g., corresponding to the critical current) may be caused to flow through the superconductor coil forming each layer.

Referring to FIGS. 6 and 7, the superconducting motor system according to the related art uses superconducting coils connected in series, the superconducting coils forming a plurality of layers. In a case in which all the superconductor coils of the plurality of layers are connected in series, there is no means for controlling a current of each layer, and the same intensity of current flows through the superconductor coils of all layers.

Meanwhile, the superconductor coils forming the plurality of layers are influenced by their environment, such as a position of each layer relative to the others and the number of turns of the superconductor coil of each layer. Due to these factors and others, the superconductor coils of the respective layers may have different critical currents.

If all the superconductor coils of the respective layers are connected in series, a same current must flow through each layer. Therefore, that same current must be equal to or lower than the lowest critical current among the critical currents of the superconductor coils of the respective layers flows so that, although more current may be able flow through the superconductor coils other than the superconductor coil having the lowest critical current, only up to that lowest critical current may be used.

Referring back to FIGS. 4 and 5, in the superconducting motor system having the multilayer structure according to an example of the present disclosure, the respective layers may be connected in parallel to control the amount of current flowing through each layer, so that a current close to the critical current may flow through the superconductor coils of all layers. As a result, more current than that in the superconducting motor system according to the related art may flow, and thus, the magnetic flux that may be generated by the superconducting motor system may be increased.

Figure 8:
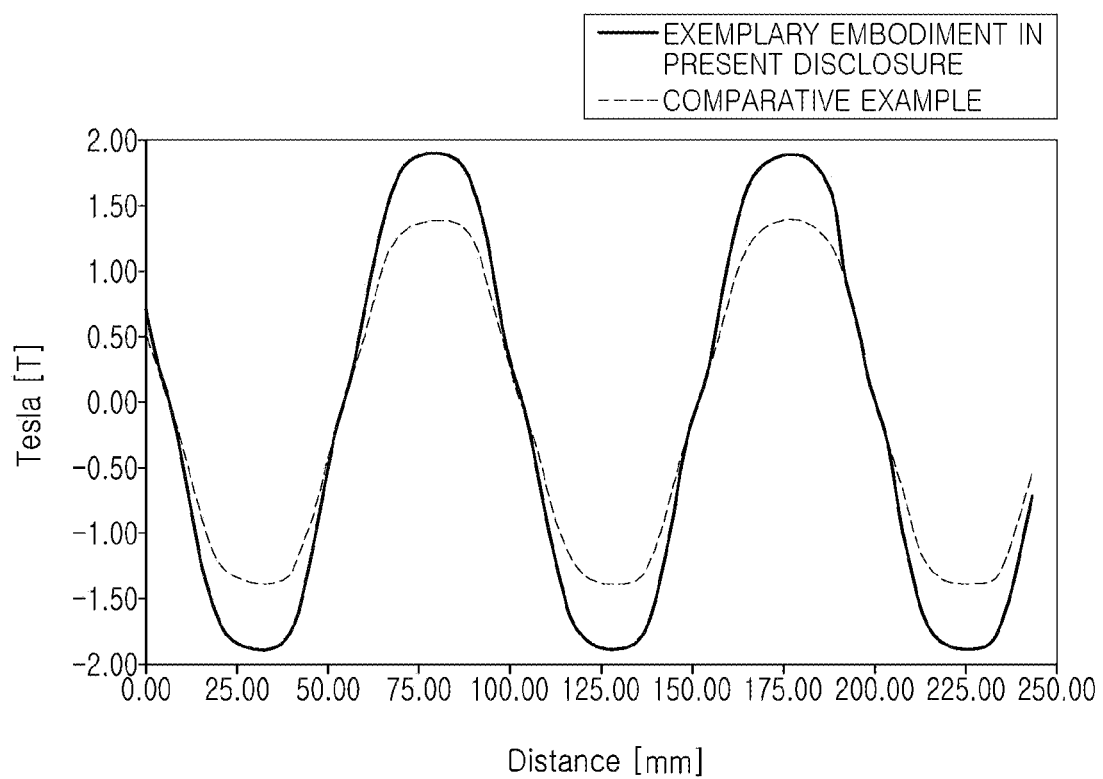
FIG. 8 is a graph illustrating magnetic flux in the superconducting motor system according to an example of the present disclosure and magnetic flux in a superconducting motor system according to a comparative example.
Figure 9:
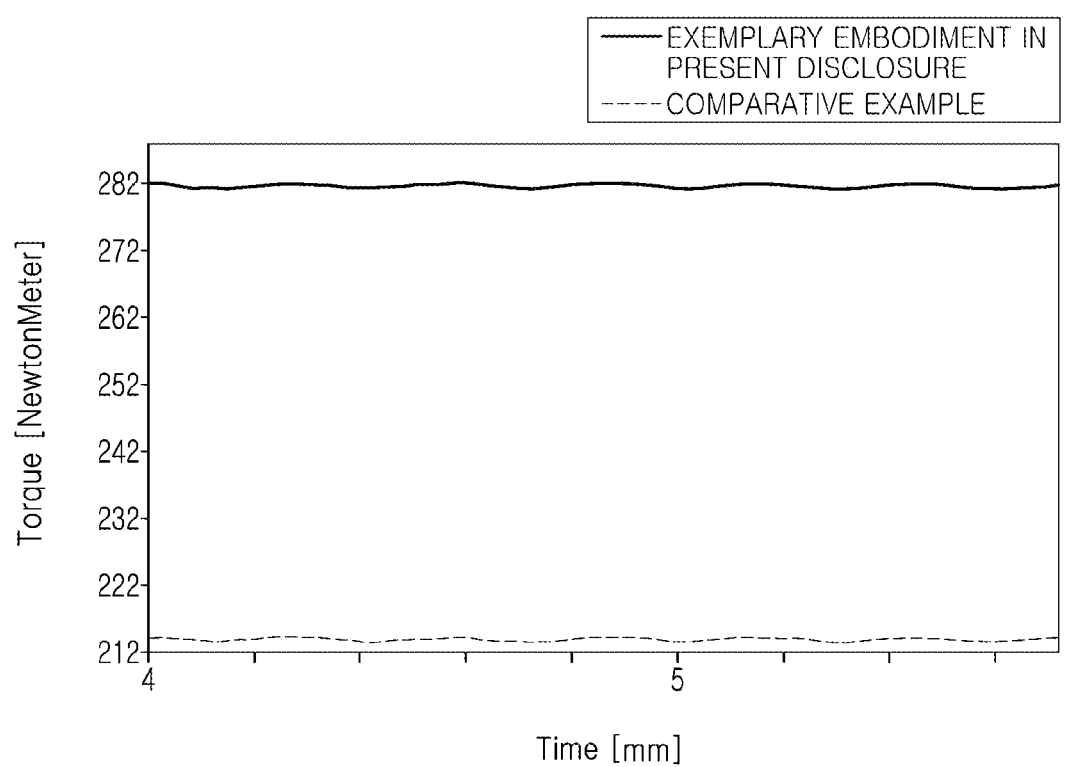
FIG. 9 is a graph illustrating a torque of the superconducting motor system according to an example of the present disclosure and a torque of the superconducting motor system according to the comparative example.
Figure 10:
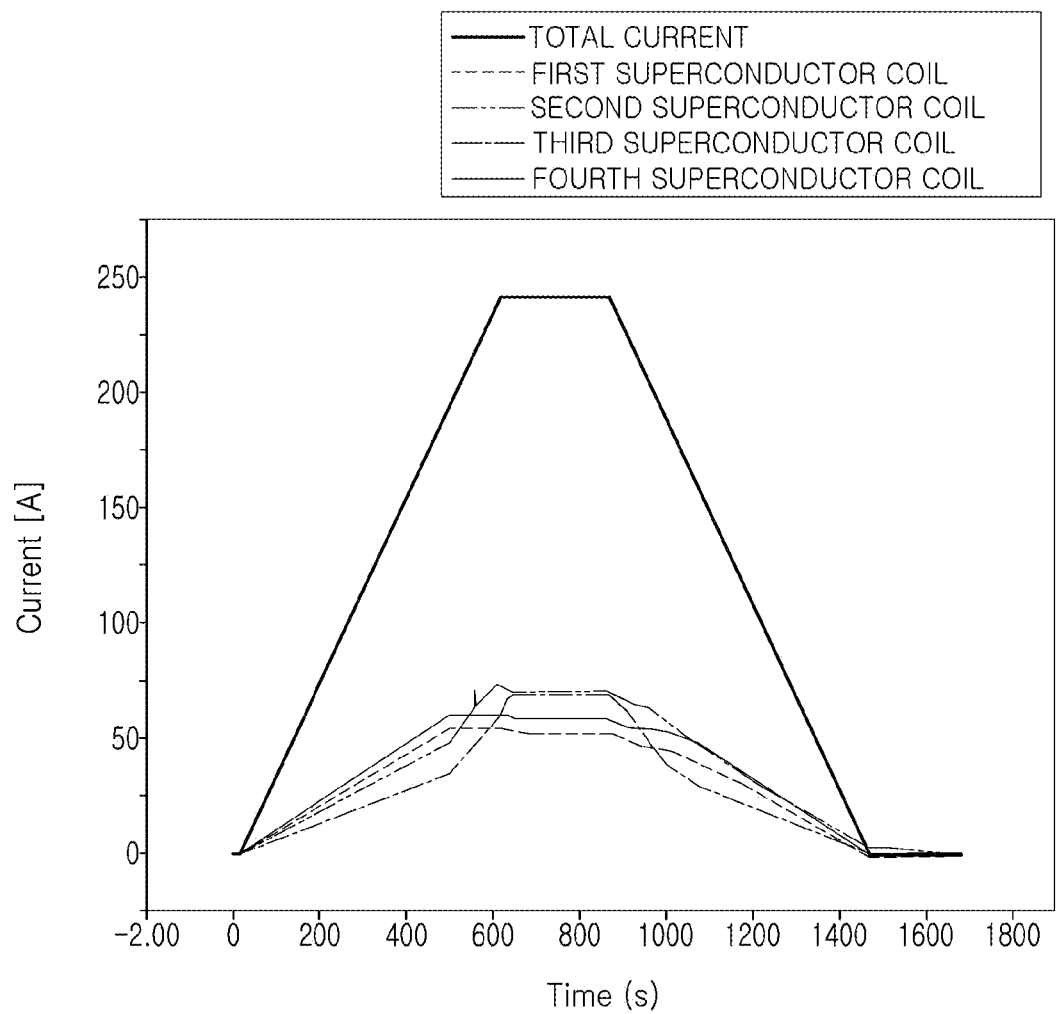
FIG. 10 is a graph illustrating a detour effect of the superconducting motor system according to an example of the present disclosure.

FIG. 8 is a graph illustrating magnetic flux in the superconducting motor system according to an example of the present disclosure and magnetic flux in a superconducting motor system according to a comparative example, FIG. 9 is a graph illustrating a torque of the superconducting motor system according to an example of the present disclosure and a torque of the superconducting motor system according to the comparative example, and FIG. 10 is a graph illustrating a detour effect of the superconducting motor system according to an example of the present disclosure.

FIGS. 8 and 9 are based on experimental data obtained using three-layer superconducting motor systems. In an analysis model for the superconducting motor systems of FIGS. 8 and 9, the critical current of the superconductor coil of the first layer was 100 amperes (A), the critical current of the superconductor coil of the second layer was 150 ampere (A), and the critical current of the superconductor coil of the third layer was 70 amperes (A). Here, the "comparative example" was a superconducting motor system in which superconductor coils of respective layers were connected in series, and the "exemplary embodiment in the present disclosure" was a superconducting motor system in which superconductor coils of respective layer were connected in parallel. In the "comparative example", a current of 70 ampere (A), which was the smallest critical current among the critical currents of the superconductor coils of the respective layers, was applied. In the exemplary embodiment in the present disclosure, the current corresponding to the critical current of each layer was applied to each layer, respectively. A current of 100 amperes (A) was applied to the superconductor coil of the first layer, a current of 150 ampere (A) was applied to the superconductor coil of the second layer, and a current of 70 amperes (A) was applied to the superconductor coil of the third layer.

Referring back to FIG. 8, it was confirmed that an air gap magnetic flux density of the superconducting motor system according to the "exemplary embodiment in the present disclosure" is higher than that of the "comparative example". Referring to FIG. 9, it was also confirmed that the torque in the "exemplary embodiment in the present disclosure" has an average value of about 282 Newton meters (Nm), which is about 30% larger than an average value of about 214 Newton meters (Nm) in the "comparative example", the torque being one output parameters of the motor. Increasing the air gap magnetic flux density and torque capabilities of a motor allows a smaller motor to be used for the same output, or a larger output may be generated with the same size of motor motor system according to the in the superconducting "exemplary embodiment in the present disclosure" relative to the "comparative example".

In the superconducting motor system according to an example of the present disclosure, since the respective superconducting coils are connected in parallel, if an overcurrent (a current above a maximum current of the superconducting motor system) is applied to the superconducting motor system superconducting coils (e.g., due to a system problem of some sort) some of the current may be able to detour to one or more coils with relatively higher critical currents causing a detour effect. Such an effect will be described in more detail with reference to FIG. 10, which shows modeling results simulating such a situation in a superconducting motor system with four super conducting coils as in FIGS. 1-6. Referring to FIG. 10, although an overcurrent flowed around 500 seconds (s), due to the parallel connection, a current exceeding the critical current is not applied to the first and second superconductor coils 210 and 220, for which the target current corresponding to the critical current has already flowed and reached an equilibrium state. An increased current flowed through the third and fourth superconductor coils 230 and 240, which have relatively higher critical currents, that is, the overcurrent applied to the superconducting motor system detours to the third and fourth superconductor coils 230 and 240. That is, as the overcurrent flows through the third superconductor coil 230 and the fourth superconductor coil 240, each of which have relatively higher critical currents, a current higher than the critical current may be prevented from flowing through the first superconductor coil 210 and the second superconductor coil 220, which allows for their superconductor properties to be maintained.

Figure 11:
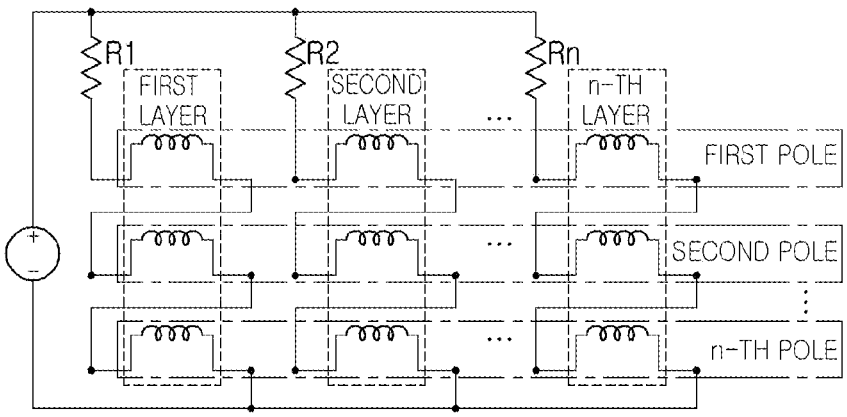
FIG. 11 is a circuit diagram of the superconducting motor system according to an example of the present disclosure in which a single power supply is used.
Figure 12:
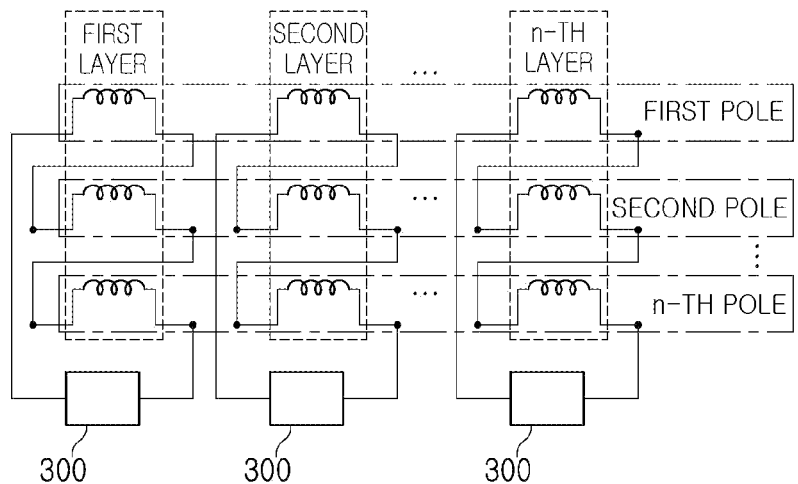
FIG. 12 is a circuit diagram of a superconducting motor system according to another example of the present disclosure in which individual power supplies are used.
Figure 13:
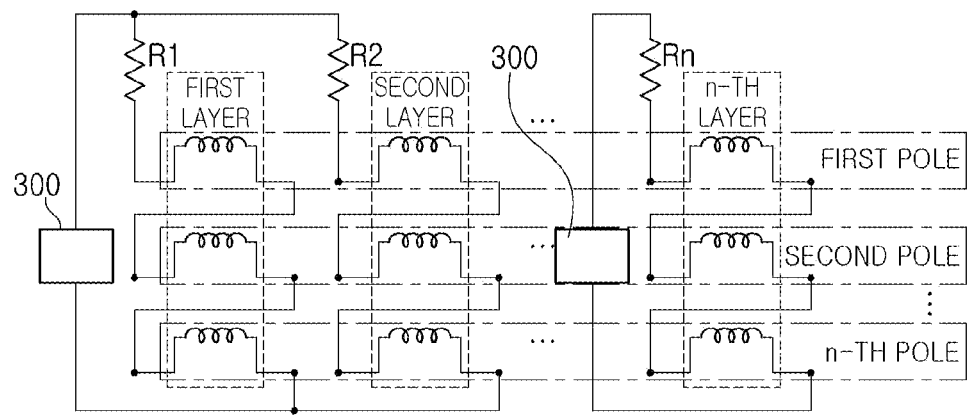
FIG. 13 is a circuit diagram of a superconducting motor system according to another example of the present disclosure in which the power supplies are used in combination.

FIG. 11 is a circuit diagram of the superconducting motor system according to an example of the present disclosure in which a single power supply is used, FIG. 12 is a circuit diagram of a superconducting motor system according to another example of the present disclosure in which individual power supplies are used, and FIG. 13 is a circuit diagram of a superconducting motor system according to another example of the present disclosure in which the power supplies are used in combination.

In the superconducting motor system according to an example of the present disclosure, currents flowing through the superconducting coils forming the respective layers may be controlled to be different from each other. In the superconducting motor system having the multilayer structure, the superconductor coils forming the respective layers may have different critical currents, and a current corresponding to the critical current of the superconducting coil forming each layer may flow. Here, the critical current of the superconductor coil of each layer of the superconducting motor system may be obtained through experimentation, simulation, or model analysis during a design process of the motor, and various known technologies that enable confirmation of the critical current may be applied.

Referring to FIG. 11, the superconducting motor system according to an example of the present disclosure may use a single power supply and may control a current flowing through each superconductor coil by controlling the resistor connected to the layer formed by each superconductor coil. Here, the value of the total current and the resistor connected to each superconductor coil may be controlled using Equation 5.

Referring to FIG. 12, the superconducting motor system according to another example of the present disclosure may include individual power supplies for the superconductor coils forming the respective layers and may control the individual power supplies in such a manner that a current corresponding to the critical current of each superconductor coil flows. Here, power supplies connected to the respective superconductor coils may be provided as the individual power supplies, or active elements such as inverters and transistors connected to one power supply may be utilized as the individual power supplies.

Referring to FIG. 13, the superconducting motor system according to another example of the present disclosure may use the method of using the single power supply and the method of using the individual power supplies in combination. For example, the superconductor coils forming the first layer and the second layer may be connected in parallel, and a current flowing through each superconductor coil may be controlled through the resistor, and the superconductor coils forming an n-th layer may be connected in series, and the individual power supply through which a current corresponding to the critical current of the superconductor coil of the n-th layer may flow may be connected. Such a method may be used when applying a current by connecting the superconductor coils with similar critical currents in a case where it is difficult to connect the superconductor coils of all layers in parallel due to a structural problem, or a difference in critical current between the superconductor coils of some layers is large.

In the superconducting motor system according to an example of the present disclosure, a current may individually flow according to the critical current of the superconductor forming each layer, and thus, more current may flow through the superconductor coil included in the superconducting motor system.

In addition, in the superconducting motor system having the multilayer structure according to an example of the present disclosure, a current may individually flow according to the critical current of the superconductor forming each layer, and thus, more current may flow. As a result, the performance of the motor, such as the air gap magnetic flux density and the torque, may be improved.

As set forth above, according to the example of the present disclosure, in the superconducting motor system, a current based on the critical current of the superconductor coil forming each layer may individually flow regardless of the lowest critical current among the critical currents of the superconductor coils forming the respective layers, so that more current may flow.

In addition, in the superconducting motor system, a current based on the critical current of the superconductor coil forming each layer may individually flow regardless of the lowest critical current among the critical currents of the superconductor coils forming the respective layers, so that more current may flow. As a result, more magnetic flux may be generated.

An aspect of the present disclosure may provide a superconducting motor system having a multilayer structure (e.g., having a plurality of superconductor layers) that enables applying a different current for each layer.

Another aspect of the present disclosure may provide a superconductor motor system having a multilayer structure that enables applying a different current for each layer by using a resistor, and/or a power supply.

According to an aspect of the present disclosure, a superconducting motor system may include: a stator forming a magnetic field, and rotors surrounded by the stator, forming a plurality of poles. The rotor may rotate when a current is applied thereto. The rotor may include: a superconductor winding portion provided for each pole and in which superconductor coils are wound while forming at least two layers; a power supply portion supplying a current to the superconductor winding portion; and a resistor portion connecting the superconductor winding portion and the power supply portion, and the resistor portion is disposed in such a manner currents that having different intensities respectively flow through the at least two layers formed in the superconductor winding portion.

The superconducting motor system may further include a lead portion connecting the superconductor coil of each layer formed in the superconductor winding portion and the power supply portion, in which the lead portion includes a first lead supplying a current generated in the power supply portion to the superconductor winding portion through the resistor portion, and a second lead transferring a current passing through the superconductor winding portion to the power supply portion.

In the superconductor winding portions formed for the plurality of poles, the superconductor coils forming the same layer may be connected to each other in series, and the superconductor coils forming different layers may be connected to the lead portion in parallel.

The superconductor winding portion may include first to n-th superconductor coils forming first to n-th layers, and the resistor portion may include first to n-th resistors connected to the first to n-th superconductor coils, respectively, where n is a natural number greater than 2.

Sizes of the first to n-th resistors may be determined based on critical currents of the superconductor coils of the first to n-th layers, respectively.

According to another aspect of the present disclosure, a superconducting motor system may include: a stator forming a magnetic field; and rotors surrounded by the stator, forming a plurality of poles, and rotating when a current is applied thereto, in which the rotor includes: a superconductor winding portion provided for each pole and in which superconductor coils are wound while forming at least two layers; and a power supply portion supplying a current to the superconductor winding portion, and the power supply portion is disposed in such a manner that currents having different intensities respectively flow through the at least two layers formed in the superconductor winding portion.

A plurality of power supply portions may be formed corresponding to the at least two layers formed by the superconductor coils, and in the superconductor winding portions for the plurality of formed poles, the superconductor coils forming the same layer may be connected to each other in series, and the superconductor coils forming different layers may be connected to a lead portion in parallel.

The superconductor winding portion may include first to n-th superconductor coils forming first to n-th layers, and the power supply portion may include first to n-th power supplies coupled to the first to n-th superconductor coils, respectively, where n is a natural number greater than 2.

Sizes of the first to n-th power supplies may be determined based on critical currents of the first to n-th superconductor coils, respectively.

According to another aspect of the present disclosure, a superconducting motor system may include: a stator forming a magnetic field; and rotors surrounded by the stator, forming a plurality of poles, and rotating when a current is applied in which thereto, the rotor includes: a superconductor winding portion provided for each pole and in which superconductor coils are wound while forming at least two layers; a power supply portion supplying a current to the superconductor winding portion; and a resistor portion connecting the superconductor coils and the power supply portion, and the resistor portion and the power supply portion are disposed in such a manner that currents having different intensities respectively flow through the at least two or more layers formed in the superconductor winding portion.

The superconducting motor system may further include a lead portion connecting the superconductor coil of each layer formed in the superconductor winding portion and the power supply portion, in which the lead portion includes a first lead supplying a current generated in the power supply portion to the superconductor winding portion through the resistor portion, and a second lead transferring a current passing through the superconductor winding portion to the power supply portion.

In the superconductor winding portions formed for the plurality of poles, the superconductor coils forming the same layer may be connected to each other in series, and some layers of the superconductor coils of the superconductor winding portions may be connected to each other in series, and the some layers of the superconductor coils connected in series may be connected to the lead portion in parallel together with remaining layers of the superconductor coils that are not connected in series.

Each resistor portion may be disposed between the lead portion and the layers of the superconductor coils connected to the lead portion in parallel.

Sizes of resistors of each resistor portion disposed between the lead portion and the layers of the superconductor coils connected to the lead portion in parallel may be determined based on critical currents of the superconductor coils connected to the lead portion in parallel.

A difference in critical current between the layers of the superconductor coils connected to each other in series may be equal to or less than a preset value.

While examples have been shown and described above, it will be apparent to those skilled in the art that modifications and variations could be made without departing from the scope of the present disclosure as defined by the appended claims.

What is claimed is:

1. A superconducting motor system comprising:
a stator configured to form a magnetic field; and
a rotor, surrounded by the stator, configured to form a plurality of poles, and configured to rotate when a current is applied thereto,
wherein the rotor comprises:
   superconductor winding portions, for the plurality of poles, that each comprise at least two superconductor coils arranged in at least two layers;
   a power supply portion configured to supply a current to the superconductor winding portions; and
   a resistor portion configured to connect the superconductor winding portions to the power supply portion, and configured to allow different currents to flow through the at least two layers of each of the superconductor winding portions, and
wherein, in each of the superconductor winding portions:
   superconductor coils, of the at least two superconductor coils of the superconductor winding portion, disposed in a same layer, of the at least two layers of the superconductor winding portion, are connected in series with each other, and
   superconductor coils, of the at least two superconductor coils of the superconductor winding portion, disposed in different layers, of the at least two layers of the superconductor winding portion, are connected in parallel to a lead portion.

2. The superconducting motor system of claim 1, wherein, in each of the superconductor winding portions, the lead portion:
   is configured to connect the at least two layers of the superconductor winding portion to the power supply portion,
   comprises a first lead configured to supply a current from the power supply portion to the superconductor winding portion through the resistor portion, and
   comprises a second lead configured to transfer a current from the superconductor winding portion to the power supply portion.

3. The superconducting motor system of claim 1, wherein:
at least one of the superconductor winding portions comprises n superconductor coils forming n layers, and
the resistor portion comprises, for the at least one of the superconductor winding portions, n resistors connected to the n superconductor coils, respectively, wherein n is a natural number greater than 2.

4. The superconducting motor system of claim 3, wherein resistances of the n resistors are determined based on critical currents of the superconductor coils of the n layers.

5. A superconducting motor system comprising:
a stator configured to form a magnetic field; and
a rotor, surrounded by the stator, configured to form a plurality of poles, and configured to rotate when a current is applied thereto,
wherein the rotor comprises:
   superconductor winding portions, for the plurality of poles, that each comprises at least two superconductor coils arranged in at least two layers; and
   a power supply portion configured to supply a current to the superconductor winding portions, wherein the power supply portion is configured to enable different currents to flow through the at least two layers of each of the superconductor winding portion, and
wherein, in each of the superconductor winding portions:
   superconductor coils, of the at least two superconductor coils of the superconductor winding portion, disposed in a same layer, of the at least two layers of the superconductor winding portion, are connected to each other in series, and superconductor coils, of the at least two superconductor coils of the superconductor winding portion, disposed in different layers, of the at least two layers of the superconductor winding portions, are connected to a power supply, of the power supply portion, in parallel.

6. The superconducting motor system of claim 5, wherein the power supply portion comprises a plurality of power supplies corresponding to, for each of the superconductor winding portions, the at least two layers formed by the superconductor coils.

7. The superconducting motor system of claim 5, wherein at least one of the superconductor winding portions comprises n superconductor coils forming n layers, and the power supply portion comprises n power supplies coupled to the n superconductor coils, respectively, where n is a natural number greater than 2.

8. The superconducting motor system of claim 7, wherein the n power supplies are configured to provide currents determined based on critical currents of the n superconductor coils, respectively.

9. A superconducting motor system comprising:
a stator configured to form a magnetic field; and
a rotor, surrounded by the stator, configured to form a plurality of poles, and configured to rotate when a current is applied thereto,
wherein the rotor comprises:
superconductor winding portions, for the plurality of poles, that each comprises at least two superconductor coils arranged in at least two layers;
a power supply portion configured to supply a current to the superconductor winding portions; and
a resistor portion connecting the superconductor winding portions to the power supply portion,
wherein the resistor portion and the power supply portion are configured to allow different currents to flow through the at least two layers of each of the superconductor winding portions, and
wherein, in each of the superconductor winding portions:
superconductor coils, of the at least two the superconductor coils, disposed in a same layer, of the at least two layers, are connected to each other in series, and
superconductor coils, of the at least two superconductor coils, disposed in different layers, of the at least two layers, are connected in parallel to a lead portion associated with the power supply portion.

10. The superconducting motor system of claim 9, wherein, in each of the superconductor winding portions, the lead portion:
is configured to connect the at least two layers of the superconductor winding portion to the power supply portion,
comprises a first lead configured to supply a current from the power supply portion to the superconductor winding portion through the resistor portion, and
comprises a second lead configured to transfer a current from the superconductor winding portion to the power supply portion.

11. The superconducting motor system of claim 10, wherein, for each of the superconductor winding portions, the resistor portion is disposed between the lead portion of the superconductor winding portion and the at least two layers of the superconductor coils of the superconductor winding portion.

12. The superconducting motor system of claim 11, wherein, for a superconductor winding portion of the superconductor winding portions, resistances of resistors of the resistor portion are based on critical currents of the at least two superconductor coils of the superconductor winding portion.

13. The superconducting motor system of claim 10, wherein a difference between critical currents of the superconductor coils connected to each other in series is equal to or less than a preset value.

* * * * *